United States Patent
Kojima et al.

(10) Patent No.: US 9,090,130 B2
(45) Date of Patent: Jul. 28, 2015

(54) PNEUMATIC TIRE

(71) Applicant: The Yokohama Rubber Co., LTD., Sandy, UT (US)

(72) Inventors: Takashi Kojima, Hiratsuka (JP); Masataka Koishi, Hiratsuka (JP); Masatoshi Kuwajima, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 132 days.

(21) Appl. No.: 13/629,327

(22) Filed: Sep. 27, 2012

(65) Prior Publication Data

US 2013/0075006 A1 Mar. 28, 2013

(30) Foreign Application Priority Data

Sep. 28, 2011 (JP) ................. 2011-212786

(51) Int. Cl.
*B60C 13/02* (2006.01)
(52) U.S. Cl.
CPC ..................... *B60C 13/02* (2013.01)
(58) Field of Classification Search
CPC ................ B60C 13/00; B60C 13/02
See application file for complete search history.

(56) References Cited

U.S. PATENT DOCUMENTS

| 4,155,393 | A * | 5/1979 | Grawey ................. 152/523 |
| 6,920,906 | B2 * | 7/2005 | Allison et al. ........... 152/209.16 |
| 8,434,534 | B2 | 5/2013 | Barton |
| 8,522,844 | B2 | 9/2013 | Yamaguchi |
| 2010/0139832 | A1 * | 6/2010 | Rittweger ................. 152/523 |

FOREIGN PATENT DOCUMENTS

| GB | 178496 | * | 4/1922 |
| JP | H10-000907 | | 1/1998 |
| JP | 2004-291938 | * | 10/2004 |
| JP | 2006-256355 | | 9/2006 |
| JP | 2008-222006 | | 9/2008 |
| JP | 2008-222007 | | 9/2008 |
| JP | 2009-029380 | | 2/2009 |
| JP | 2009-160991 | | 7/2009 |
| JP | 2009-160992 | | 7/2009 |
| JP | 2010-047251 | | 3/2010 |
| JP | 2010-536648 | | 12/2010 |
| KR | 910046 | * | 7/2009 |
| KR | 100910046 | | 7/2009 |
| WO | WO 2007-032405 | | 3/2007 |
| WO | WO 2009-017167 | | 2/2009 |

OTHER PUBLICATIONS

Japanese Decision of a Grant Patent dated Nov. 5, 2013, 3 pages, Japan.

* cited by examiner

*Primary Examiner* — Justin Fischer
(74) *Attorney, Agent, or Firm* — Thorpe North & Western

(57) ABSTRACT

A pneumatic tire includes a turbulent flow generating fin on a surface of a tire side portion. A plurality of the fins is arranged in a tire radial direction having a predetermined gap so as to form a fin row. Additionally, a plurality of the fin rows is disposed in a tire circumferential direction at a predetermined pitch. Moreover, the adjacent fins are disposed so as to overlap each other in the tire circumferential direction and a tire radial direction.

17 Claims, 12 Drawing Sheets

FIG. 17

| | Conventional Example 1 | Conventional Example 2 | Working Example 1 | Working Example 2 | Working Example 3 | Working Example 4 | Working Example 5 | Working Example 6 | Working Example 7 |
|---|---|---|---|---|---|---|---|---|---|
| Fin shape | Straight line shape (FIG. 18) | Straight line shape (FIG. 19) | Bent shape (FIG. 6) | Bent shape (FIG. 6) | Bent shape (FIG. 6) | Bent shape (FIG. 6) | Inclined straight line shape (FIG. 10) | Narrow bent + inclined straight lines (FIG. 13) | Narrow circular arc shape (FIG. 15) |
| Fin row | - | - | Straight line in radial direction | Straight line in radial direction | Straight line in radial direction | Straight line in radial direction | Straight line in radial direction | Two rows in series | Curved |
| Fin overlap | Circumferential direction | Radial direction | Circumferential direction Radial direction | Circumferential direction Radial direction | Circumferential direction Radial direction | Circumferential direction Radial direction | Circumferential direction Radial direction | Circumferential direction Radial direction | Circumferential direction Radial direction |
| L/SH (outer side / inner side) | - | 0.70 | 0.70 | 0.10 | 0.90 | 0.70 | 0.70 | 0.60 | 0.75 |
| Gap g [mm] | - | 5 | 1 | 1 | 1 | 0.5 | 1 | 1 | 1 |
| "See-through-less" around entire periphery | - | - | ○ | ○ | ○ | ○ | × | Partially separated | ○ |
| Fuel economy evaluation | 100 | 99 | 104 | 102 | 104 | 104 | 103 | 103 | 103 |

PNEUMATIC TIRE

PRIORITY CLAIM

Priority is claimed to Japan Patent Application Serial No. 2011-212786 filed on Sep. 28, 2011.

BACKGROUND

1. Technical Field

The present technology relates to a pneumatic tire, and particularly relates to a pneumatic tire whereby fuel economy can be enhanced.

2. Related Art

In recent years, the reduction of rolling resistance of tires has become an issue for pneumatic tires in order to improve the fuel economy of vehicles. Normally the air resistance of tires increases in proportion to the square of the air velocity. Also, as the air resistance of tires increases, the rolling resistance of tires increases.

Therefore, conventional pneumatic tires are provided with turbulent flow generating fins on a surface of the tire side portion, so that these fins generate turbulent flow, and reduce the tire rolling resistance.

The technology described in Japanese Unexamined Patent Application Publication No. 2008-222006A and Japanese Unexamined Patent Application Publication No. 2008-222007A, for example, is known as conventional pneumatic provided with turbulent flow generating fins. However, in the pneumatic tires in Japanese Unexamined Patent Application Publication No. 2008-222006A and Japanese Unexamined Patent Application Publication No. 2008-222007A, the fins are mainly used for cooling the tire side portions.

SUMMARY

The present technology provides a pneumatic tire by which fuel economy can be enhanced, A pneumatic tire according to the present technology includes a turbulent flow generating fin on a surface of a tire side portion. A plurality of the fins is arranged in a tire radial direction having a predetermined gap so as to form a fin row, and a plurality of the fin rows is disposed in a tire circumferential direction at a predetermined pitch. Moreover, adjacent fins are disposed so as to overlap each other in the tire circumferential direction and the tire radial direction.

Additionally, with the pneumatic tire according to the present technology, a sum L of a distance between centers of gravity of the fins in one of the fin rows, and a tire cross-section height SH preferably have a relationship such that $0.10 \leq L/SH \leq 0.09$.

Additionally, with the pneumatic tire according to the present technology, when an entire periphery of the fin row is viewed as a projection along the surface of the tire side portion, the adjacent fins are preferably disposed so as to overlap such that an opposite side is not visible through the gap.

Additionally, with the pneumatic tire according to the present technology, the plurality of fins constituting one of the fin rows comprises a bent portion or a curved portion, and is preferably disposed so that said bent portions or said curved portions mate with each other.

In the pneumatic tire according to the present technology, adjacent fins are arranged having a predetermined gap, so compared with a constitution in which a single long fin is disposed, the surface area of the tire side portion is increased. In this way, the turbulent flow generation effect of the fins is increased. On the other hand, adjacent fins are disposed so as to overlap each other in the tire circumferential direction and the tire radial direction, so at the surface of the tire side portion, air is effectively agitated. In this way, the turbulent flow generation effect of the fins is increased, which has the advantage that fuel economy is improved.

BRIEF DESCRIPTION OF THE DRAWINGS

FIG. 17 is a table showing results of performance testing of pneumatic tires according to embodiments of the present technology.

DETAILED DESCRIPTION

The present technology is described below in detail with reference to the drawings. However, the present technology is not limited to this embodiment. Moreover, constituents of the embodiment which can possibly or obviously be substituted while maintaining consistency with the present technology are included. Furthermore, a plurality of modified examples that are described in the embodiment. can be freely combined within a scope of obviousness for a person skilled in the art.

Pneumatic Tire

Figure 1:
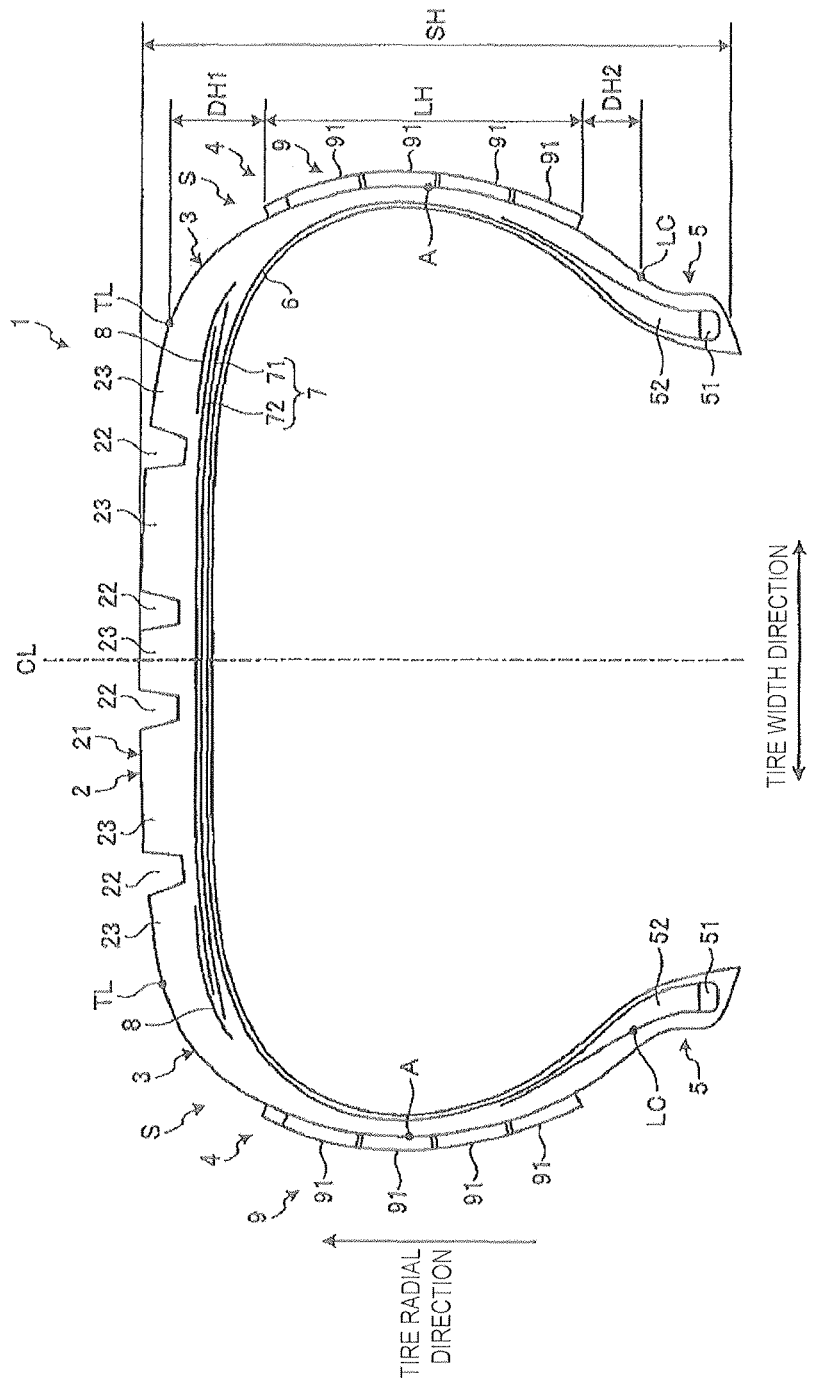
FIG. 1 is a cross-sectional view in a tire meridian direction illustrating a pneumatic tire according to an embodiment of the present technology.

FIG. 1 is a cross-sectional view in a tire meridian direction illustrating a pneumatic time according to an embodiment of the present technology. This drawing depicts a radial tire for use on a passenger car.

In the following description, "tire radial direction" refers to a direction orthogonal to the rotational axis (not shown) of the pneumatic tire; "inner side in the tire radial direction" refers to the side facing the rotational axis in the tire radial direction; and "outer side in the tire radial direction" refers to the side distanced from the rotational axis in the tire radial direction. "Tire circumferential direction" refers to a circumferential direction with the rotational axis as a center axis. Additionally, "tire width direction" refers to the direction parallel to the rotational axis; "inner side in the tire width direction" refers to the side facing a tire equatorial plane CL (tire equator line) in the tire width direction; and "outer side in the tire width direction" refers to the side distanced from the tire equatorial plane CL in the tire width direction. "Tire equatorial plane CL" refers to a plane that is orthogonal to the rotational axis of the pneumatic tire and that passes through a center of a tire width of the pneumatic tire. The tire width is a width in the tire width direction between constituents located to the outside in the tire width direction, or in other words, the distance between the constituents that are most distant in the tire width direction from the tire equatorial plane CL. "Tire equator line" refers to a line along the tire circumferential direction of the pneumatic tire that lies on the tire equatorial plane CL. In this embodiment, "tire equator line" is given the same "CL" reference symbol as that used for the tire equatorial plane.

As illustrated in FIG. 1, the pneumatic tire 1 of this embodiment includes a tread portion 2, shoulder portions 3 on both sides of the tread portion 2, and a side wall portion 4 and a bead portion 5 continuing sequentially from each of the shoulder portions 3. Additionally, the pneumatic tire 1 includes a carcass layer 6, a belt layer 7, and a belt reinforcing layer 8.

The tread portion 2 is formed from a rubber material (tread rubber), is exposed on the outermost side in the tire radial direction of the pneumatic tire 1, and a surface thereof constitutes a profile of the pneumatic tire 1. A tread surface 21 is formed On a peripheral surface of the tread portion 2 or, rather, on a road contact surface that contacts a road surface when traveling. The tread surface 21 extends along the tire circumferential direction, and a plurality (four in this embodiment) of main grooves 22 that are straight main grooves parallel with the tire equatorial plane CL is provided in the tread surface 21. Moreover, a plurality of rib-like land portions 23 extending along the tire circumferential direction and parallel with the tire equatorial plane CL is formed in the tread surface 21 by the plurality of main grooves 22. Additionally, while not explicitly illustrated in the drawings, lug grooves that intersect with the main grooves 22 in each of the land portions 23 are provided in the tread surface 21. The land portions 23 are plurally divided in the tire circumferential direction by the lug grooves. Additionally, the lug grooves are formed so as to open to an outermost side in the tire width direction of the tread portion 2, that is, the outer side in the tire width direction. Note that the lug grooves may have a form that communicates with the main grooves 22 or may have a form that does not communicate with the main grooves 22.

The shoulder portions 3 are locations on both outer sides in the tire width direction of the tread portion 2. Additionally, the side wall portions 4 are exposed at an outermost side in the tire width direction of the pneumatic tire 1. The bead portions 5 include a bead core 51 and a head filler 52. The head core 51 is formed by winding a steel wire (bead wire) in a ring-like manner. The bead filler 52 is a rubber material that is disposed in space formed by ends of the carcass layer 6 in the tire width direction being folded up at a position of the bead core 51.

The ends of the carcass layer 6 in the tire width direction are folded over the pair of bead cores 51 from the inner side in the tire width direction to the outer side in the tire width direction, and the carcass layer 6 is stretched in a toroidal shape in the tire circumferential direction to form the framework of the tire. The carcass layer 6 is constituted by a plurality of carcass cords (not illustrated) juxtaposed in the tire circumferential direction along the tire meridian direction having a given angle with respect to the tire circumferential direction, and covered by a coating rubber. The carcass cords are formed from organic fibers (e.g. polyester, rayon, nylon, or the like). At least one layer of this carcass layer 6 is provided.

The belt layer 7 has a multi-layer structure where at least two layers (belts 71 and 72) are stacked; is disposed on an outer side in the tire radial direction that is the periphery of the carcass layer 6, in the tread portion 2; and covers the carcass layer 6 in the tire circumferential direction. The belts 71 and 72 are constituted by a plurality of cords (not illustrated) juxtaposed at a predetermined angle with respect to the tire circumferential direction (e.g. from 20 degrees to 30 degrees), and covered by a coating rubber. The cords are formed from steel or organic fibers (e.g. polyester, rayon, nylon, or the like). Moreover, the overlapping belts 71 and 72 are disposed so that the cords thereof mutually cross.

The belt reinforcing layer 8 is disposed on the outer side in the tire radial direction that is the periphery of the belt layer 7, and covers the belt layer 7 in the tire circumferential direction. The belt reinforcing layer 8 is constituted by a plurality of cords (not illustrated), juxtaposed in the tire width direction and parallel ($\pm 5$ degrees) to the tire circumferential direction, which are covered by a coating rubber. The cords are formed from steel or organic fibers (e.g. polyester, rayon, nylon, or the like). The belt reinforcing layer 8 illustrated in FIG. 1 is disposed so as to cover end portions in the tire width direction of the belt layer 7. The configuration of the belt reinforcing layer 8 is not limited to that described above. While not explicitly illustrated in the drawings, a configuration may be used where the belt reinforcing layer 8 is disposed so as to cover an entirety of the belt layer 7. Alternatively, for example, a configuration may be used where the belt reinforcing layer 8 has two reinforcing layers, where the belt reinforcing layer 8 is formed so that the reinforcing layer on the inner side in the tire radial direction is longer in the tire width direction than the belt layer 7 and disposed so as to cover the entirety of the belt layer 7, and the reinforcing layer on the outer side in the tire radial direction is disposed so as only to cover the end portions in the tire width direction of the belt layer 7. Alternatively, for example, a configuration may be used where the belt reinforcing layer 8 has two reinforcing layers, where each of the reinforcing layers is disposed so as only to cover the end portions in the tire width direction of the belt layer 7. In other words, the belt reinforcing layer 8 overlaps with at least the end portions in the tire width direction of the belt layer 7. Additionally, the belt reinforcing layer 8 is provided by winding band-like (e.g. with a width of 10 mm) strip material in the tire circumferential direction.

Tire Side Portion

Here, an area from a tire ground contact edge TL to a rim check line LC is referred to as the tire side portion S (see FIG. 1). The tire side portion S includes not only the side wall portion 4, but also a portion of the shoulder portion 3 and a portion of the bead portion 5.

The "tire ground contact edge TL" refers to the maximum width position in a tire axial direction of a contact surface between the tire and a flat plate in a configuration in which the tire is mounted on a regular rim, filled to a prescribed internal pressure, placed perpendicularly with respect to the flat plate in a static state, and loaded with a load corresponding to a regular load. The "rim check line LC" refers to a line used to confirm whether the tire has been assembled on the rim correctly, and, typically, is indicated on a front side surface of the bead portions.

Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the regular internal pressure is an air pressure of 180 kPa, and the regular load is 88% of the maximum load capacity.

Fin Row of the Tire Side Portion

Figure 2:
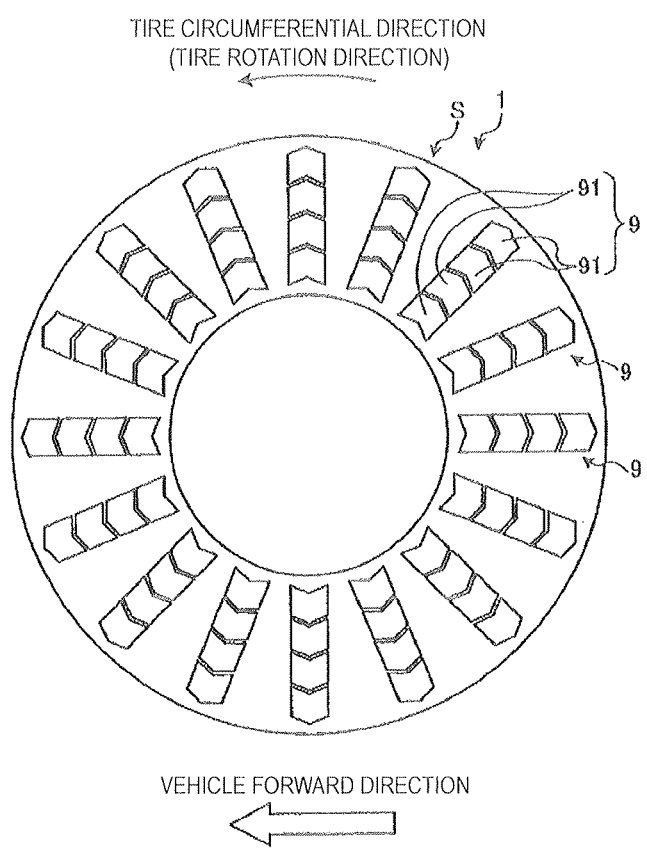
FIG. 2 is a side view illustrating the pneumatic tire depicted in FIG. 1.
Figure 3:
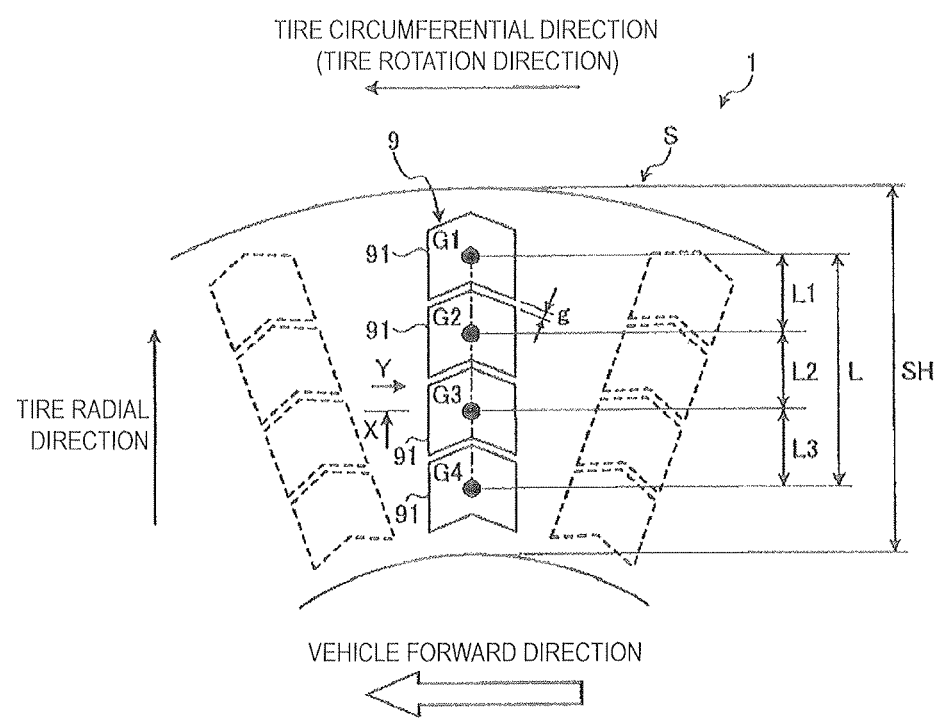
FIG. 3 is an enlarged view illustrating fins of the pneumatic tire depicted in FIG. 2.
Figure 4:
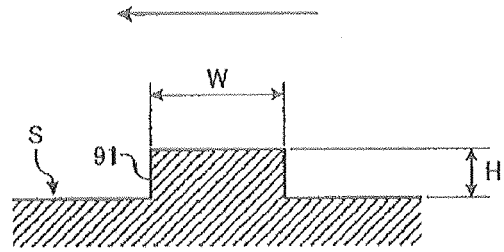
FIG. 4 is a cross-sectional view at X illustrating the fins depicted in FIG. 3.
Figure 5:
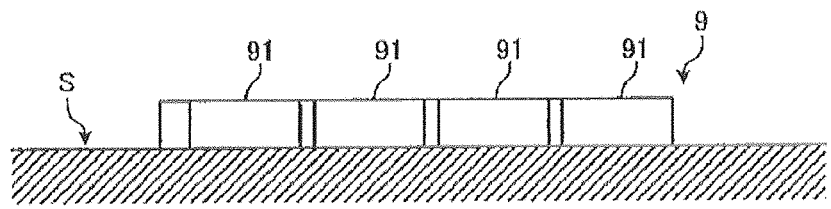
FIG. 5 is a cross-sectional view at Y illustrating the fins depicted in FIG. 3.

FIG. 2 is a side view illustrating the pneumatic tire depicted in FIG. 1. FIG. 3 is an enlarged view illustrating the fins of the pneumatic tire depicted in FIG. 2. FIG. 4 is a cross--sectional view at X illustrating the fins depicted in FIG. 3. FIG. 5 is a cross-sectional view at Y illustrating the fins depicted in FIG. 3. In these drawings, FIG. 2 illustrates the whole constitution of the tire side portion. Also, FIG. 3 illustrates in solid lines a fin row per unit pitch. Also, FIG. 4 illustrates a cross-sectional view when a fin is sectioned in a plane normal to the tire radial direction. Also FIG. 5 illustrates a view of a whole fin row when viewed from the tire circumferential direction.

The pneumatic tire 1 is provided with turbulent flow generating fins 91 on a surface of the tire side portion S (see FIGS. 1 and 2).

The fins 91 are protrusions that project from a reference plane of the tire side portion S (see FIGS. 1, 4, and 5). The "reference plane of the tire side portion S" refers to a plane of the tire side portion S excluding patterns, characters, irregularities, and the like, that is used for measurement of a tire cross-sectional width stipulated by JATMA. Also, the fins 91 are formed integrally with the tire side portion S by, for example, tire molds (not illustrated on the drawings), during vulcanizing and forming of the tires. Also, the fins 91 may be disposed on the left and right tire side portions S, S (see FIG. 1), or may be disposed on only one tire side portion S (not illustrated on the drawings).

For example, in this embodiment, when viewed as a cross-section from a direction perpendicular to the longitudinal direction of the fins 91, the fins 91 have a rectangular cross-sectional shape with their bottom edge on the reference plane of the tire side portion S (see FIG. 4). Also, the fins 91 have a constant width W in the circumferential direction and a constant height H.

A plurality of fins 91 is arranged in the tire radial direction having a predetermined gap g to form a fin row 9 (see FIG. 2). Also, a plurality of fin rows 9 is disposed in the tire circumferential direction at a predetermined pitch. In this way, the plurality of fins 91 is arranged on the tire side portion S radially with the tire rotational axis as a center axis.

In the pneumatic tire 1, while the vehicle is traveling, the fins 91 generate turbulent flow at the surface of the tire side portion S when the tire is rotating. In this way, the tire air resistance is reduced, so the tire rolling resistance is reduced. Also, as a result of the fins 91, the surface area of the tire side portion S is increased, so heat dissipation from the tire is promoted. Therefore, the tire is cooled, and tire breakdowns are suppressed.

In the pneumatic tire 1, the tire cross-section height SH and the total length L (=L1+L2+L3) of the distances L1 through L3 between the centers of gravity G1 through G4 of the fins 91 in one fin row 9 preferably have a relationship such that $0.10 \leq L/SH \leq 0.90$ (see FIG. 3). In this way, the installation range of the fins 91 is made appropriate, so that the turbulent flow generation effect of the fins 91 when the tire is rotating is improved.

Also, in the pneumatic tire 1, in a cross sectional view in a fire meridian direction, a distance DH1 from an edge on the outer side in the tire radial direction of the fin 91 on the outermost side in the tire radial direction to the tire ground contact edge TL, a distance DH2 from an edge on the inner side in the time radial direction of the fin 91 on the innermost side in the tire radial direction to the rim check line LC, and the tire cross-section height SH preferably have a relationship such that $0.1 \leq DH1/SH \leq 0.5$, and $0.1 \leq DH2/SH \leq 0.5$ (see FIG. 1). In this way, the installation range of the fins 91 is made appropriate, so that the turbulent flow generation effect of the fins 91 when the tire is rotating is improved.

Also, in the pneumatic tire 1, the length LH of the fins 91 in the tire radial direction and the tire cross-section height SH preferably have a relationship such that $0.1 \leq LH/SH$. In this way, the length LH in the radial direction of the fins 91 is made appropriate, so that the turbulent flow generation effect of the fins 91 when the tire is rotating is improved. Note that there is a restriction on the upper limit on LH/SH because one fin row 9 has at least two fins 91.

Also, in the pneumatic tire 1, as illustrated in FIG. 4, the fins 91 have a rectangular cross-sectional shape with the bottom edge placed on the reference plane of the tire side portion S, when viewed as a cross-section from a direction perpendicular to the axial direction of the fin row 9. However, the configuration is not limited to this, the fin 91 may have a triangular or a trapezoidal cross-sectional shape, or may have a semi-circular shape or an elliptical shape (not illustrated on the drawings).

Also, in the pneumatic tire 1, the width W of the fin 91 in the circumferential direction is preferably in the range $1 \text{ mm} \leq W \leq 50 \text{ mm}$ (see FIG. 4). Also, the height H of the fin 91 is preferably in the range $0.5 \text{ mm} \leq H \leq 10.0 \text{ mm}$, and more preferably in the range $1.0 \text{ mm} \leq H \leq 5.0 \text{ mm}$. As a result, the width W in the circumferential direction and the height H of the fin 91 are made appropriate.

The width W in the circumferential direction of the fin 91 is the width of the fin 91 when viewed as a cross-section from a direction perpendicular to the tire radial direction. Also, the height of the fin 91 is the distance from the reference plane of the tire side portion S to the peak of the fin 91, when viewed as a cross-section from a direction perpendicular to the tire radial direction.

Also, the above ranges for the width W and the height H of the fin 91 are preferable for pneumatic tires for passenger cars. However, the range is not limited thereto for pneumatic tires having large diameters such as heavy duty pneumatic tires, and the ranges of the width and height may exceed that for passenger cars.

Overlap of Fins

Also, the adjacent fins 91, 91 are disposed so as to overlap each other in the tire circumferential direction and the tire radial direction (see FIG. 3). In other words, in one fin row 9, adjacent fins 91, 91 overlap each other in the tire circumferential direction, and overlap each other in the tire radial direction, while being arranged having a predetermined gap g in the tire radial direction. In this case, the amount of overlap of adjacent fins 91, 91 in the tire circumferential direction and that in the tire radial direction are each set to be 1 mm or greater.

For example, in this embodiment, in a plan view of the tire side portion S, the fins 91 have a bent rectangular shape, with the convex side of the bend disposed facing the outer side in the tire radial direction. Also, the plurality of fins 91 having the same shape constitute one fin row 9 arranged in a row in the tire radial direction with the orientation of their convex sides aligned.

In this case, each fin 91 is arranged so that the axial direction of the fin row 9 coincides with the tire radial direction. Specifically, the centers of gravity G1 through G4 of each fin 91, 91 are disposed on a straight line, and the angle between this straight line and the tire radial direction is 0 degree. Therefore, all the fins 91 that constitute one fin row 9 are disposed so as to overlap each other in the tire circumferential direction (their phases are aligned).

Also, the adjacent fins 91, 91 are disposed with their bent portions mating with each other while having the gap g. Also, a V-shaped gap is formed between adjacent fins 91, 91. Also, the adjacent fins 91,91 are disposed so as to overlap each other in the tire radial direction. Therefore, when a fin row 9 is viewed from the tire circumferential direction, the bent portion of one fin 91 is located in the gap between the adjacent fins 91, 91 (see FIG. 5). As a result, a structure in which the opposite side of the fin row 9 is not visible is constituted (a "see-through-less" structure). The adjacent fins 91, 91 are disposed so that the opposite side is not visible through the gap g.

In this constitution, adjacent fins 91, 91 are disposed having a predetermined gap g, so compared with a constitution in which a single long fin is disposed, the surface area of the tire side portion S is increased. In this way, the turbulent flow generation effect of the fins 91 is improved. On the other hand, adjacent fins 91, 91 are disposed so as to overlap each other in the tire circumferential direction and the tire radial direction, so at the surface of the tire side portion S, air is effectively agitated. In this way, the turbulent flow generation effect of the fins 91 is increased, and the fuel economy is improved.

In particular, in the constitution in FIG. 3, the adjacent fins 91, 91 are disposed so as to overlap such that the opposite side is not visible through the gap g when the entire periphery of the fin row 9 is viewed as a projection along the surface of the tire side portion S (see FIGS. 3 and 5). Specifically, adjacent fins 91, 91 are disposed with their bent portions mating with each other at a predetermined pitch, so between adjacent fins 91, 91, a V-shaped gap is formed. Therefore, when the entire periphery of the fin row 9 is viewed as a projection along the surface of the tire side portion 5, the gap between adjacent fins 91, 91 is shielded by the mating bent portions. In this way, the entire periphery of the fin row 9 is constituted with a "see-through-less" structure, and the turbulent flow generation effect of the fins 91 is increased.

In the pneumatic tire 1, preferably the gap g between adjacent fins 91, 91 is in the range 0.1 mm≤g (see FIG. 3). Also, there is no particular limit on the upper limit of the gap g, provided that adjacent fins 91, 91 can overlap with each other in the tire circumferential direction and the tire radial direction.

Modified Examples

FIGS. 6 through 16 are explanatory views illustrating Modified Examples 1 through 11 of the pneumatic tire depicted in FIG. 1. In these drawings, a fin row per unit pitch is illustrated in solid lines. Here, the points of difference from the fin row illustrated in FIG. 3 are described, and description of the points in common is omitted.

In the constitution in FIG. 3, in plain view of the tire side portion S, the fins 91 have a shape in which wide rectangles are bent into a V-shape (block shape), and the convex sides thereof are disposed facing the outer side in the tire radial direction. Also, the adjacent fins 91, 91 are disposed so that the bent portions mate with each other in the tire circumferential direction and the tire radial direction at a predetermined pitch.

However, the configuration is not limited to this, and the fins 91 may have a bent shape, or may have a curved shape (see FIGS. 6 through 9). Also, the fins 91 may have, for example, a shape that includes a bent portion and a curved portion, an S-shape, a W-shape, or a zigzag shape, and the like (not illustrated on the drawings). In other words, the fins 91 may have an arbitrary shape, provided that the fin 91 is disposed so as to overlap with the adjacent fin 91 in the tire circumferential direction and the tire radial direction having a predetermined gap g.

Figure 6:
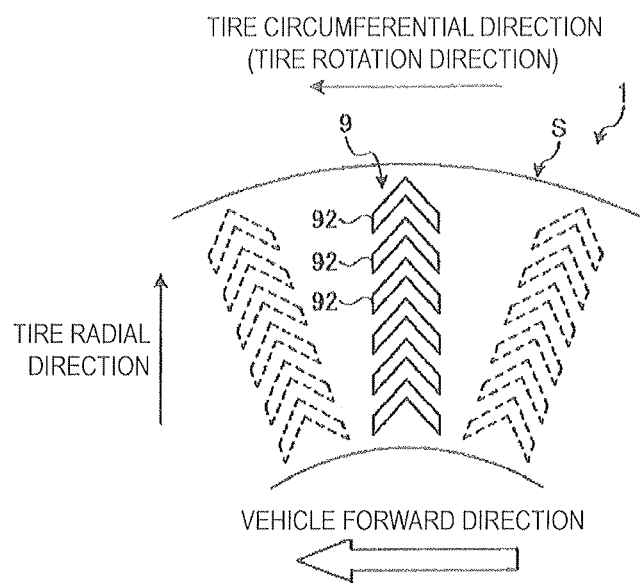
FIG. 6 is an explanatory view illustrating Modified Example 1 of the pneumatic tire depicted in FIG. 1.

For example, in Modified Example 1 in FIG. 6, a fin 92 has a shape of a narrow rectangle bent into a V-shape (rib shape), and the convex side thereof is disposed facing the outer side in the tire radial direction. Adjacent fins 92, 92 are disposed with their bent portions mating with each other at a predetermined pitch.

Figure 7:
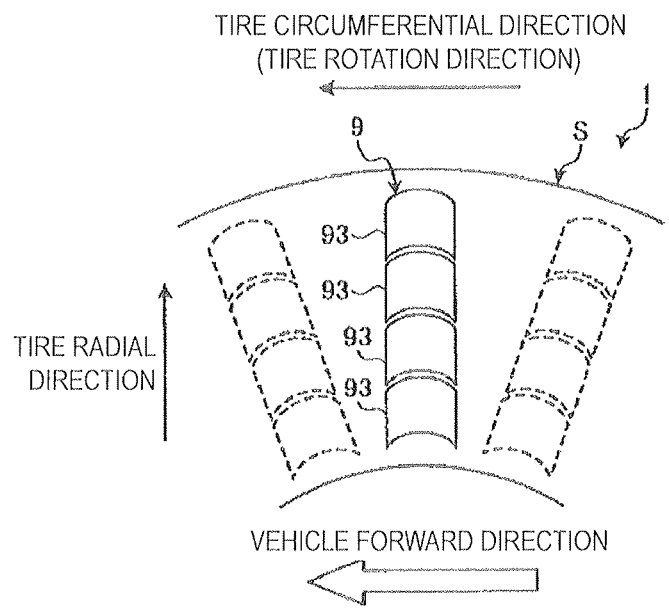
FIG. 7 is an explanatory view illustrating Modified Example 2 of the pneumatic tire depicted in FIG. 1.

Also, in Modified Example 2 in FIG. 7, a fin 93 has a shape of a wide rectangle curved into a circular arc, and the convex side thereof is disposed facing the outer side in the tire radial direction. Adjacent fins 93, 93 are disposed with their curved portions mating with each other with a predetermined pitch.

Figure 8:
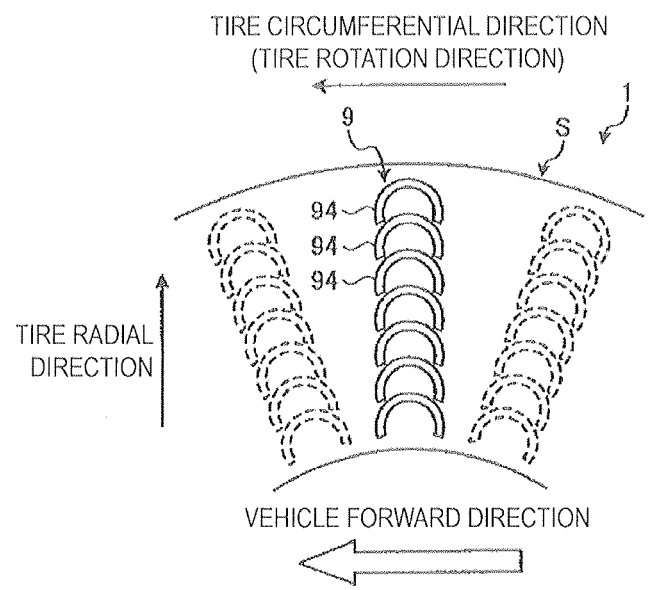
FIG. 8 is an explanatory view illustrating Modified Example 3 of the pneumatic tire depicted in FIG. 1.

Also, in Modified Example 3 in FIG. 8, a fin 94 has a shape of a narrow rectangle curved into a circular arc, and the convex side thereof is disposed facing the outer side in the tire radial direction. Adjacent fins 94, 94 are disposed with their curved portions mating with each other with a predetermined pitch.

Figure 9:
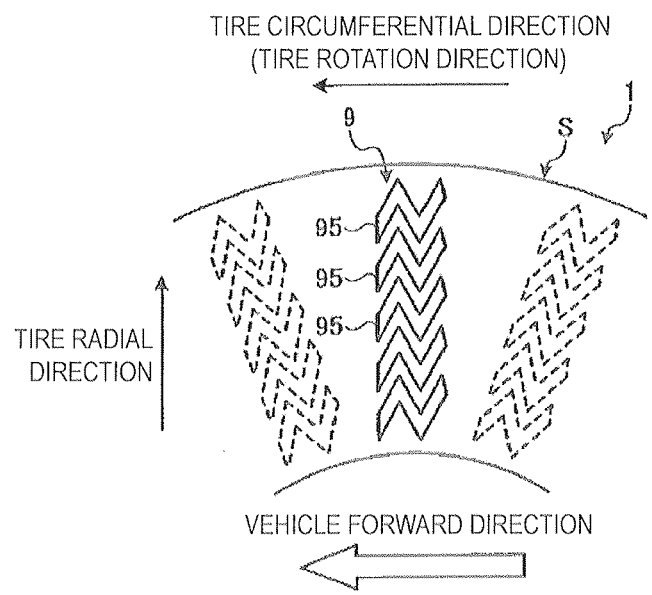
FIG. 9 is an explanatory view illustrating Modified Example 4 of the pneumatic tire depicted in FIG. 1.

Also in Modified Example 4 in FIG. 9, a fin 95 has an N-shape, and the convex and concave sides of the bent portions thereof are disposed facing the tire radial direction. Adjacent fins 95, 95 are disposed with their convex and concave bent portions mating with each other with a predetermined pitch.

In Modified Examples 1 through 4 in FIGS. 6 through 9, adjacent fins have bent or curved portions that mate with each other, so when the entire periphery of the fin row 9 is viewed as a projection along the surface of the tire side portion S, preferably the opposite side is not visible through the gap g (a "see-through-less" structure can be constituted) (see FIGS. 3, 5, and 6 through 9).

Figure 10:
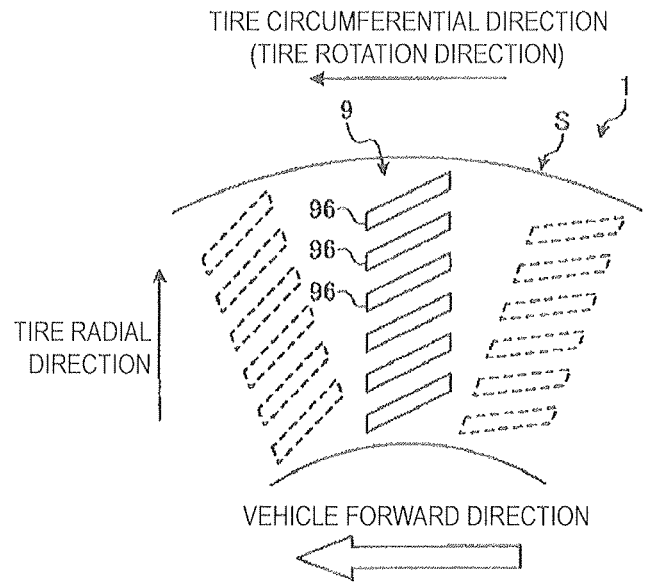
FIG. 10 is an explanatory view illustrating Modified Example 5 of the pneumatic tire depicted in FIG. 1.

However, the configuration is not limited to this, and a fin 96 may have a linear shape (a shape without bends or curves) as illustrated in Modified Example 5 in FIG. 10. It is necessary that adjacent fins 96, 96 are disposed so as to overlap each other in the tire circumferential direction and the tire radial direction. In this constitution, the turbulent flow generation effect of the fin row 9 is increased compared with a constitution in which adjacent fins overlap each other in only one of the tire circumferential direction and the tire radial direction.

Also, in the constitution in FIG. 3, the fin row 9 is constituted from a plurality of fins 91 having the same width W in the circumferential direction (see FIG. 4).

Figure 11:
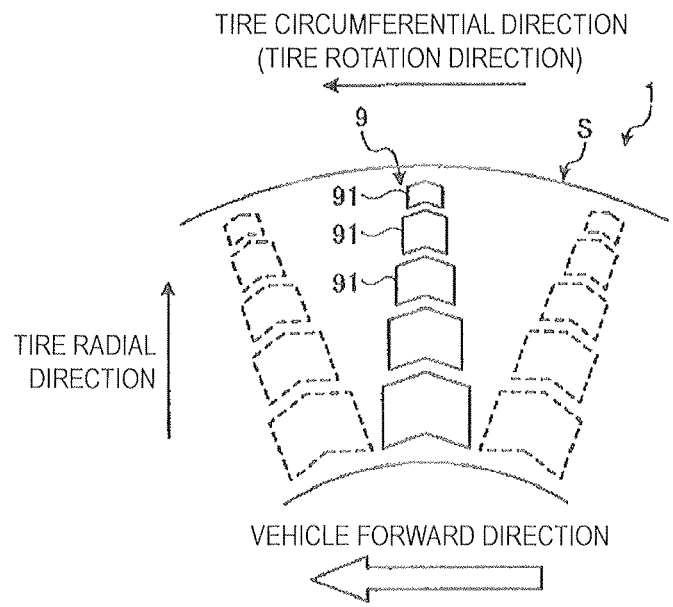
FIG. 11 is an explanatory view illustrating Modified Example 6 of the pneumatic tire depicted in FIG. 1.

In contrast, in Modified Example 6 in FIG. 11, the fin row 9 is constituted from a plurality of fins 91 having similar shapes but with different widths W in the circumferential direction (see FIG. 4). Also, the fin row 9 is constituted so that fins 91 that are further to the outer side in the tire radial direction have smaller widths W in the circumferential direction. In this constitution also, the turbulent flow generation effect of the fin row 9 is increased.

The configuration is not limited to this, and the fin row 9 may be constituted so that fins 91 that are further to the inner side in the tire radial direction have smaller widths W in the circumferential direction (not illustrated on the drawings).

Also, in the constitution in FIG. 3, the fin row 9 is constituted from only one type of fin 91.

Figure 12:
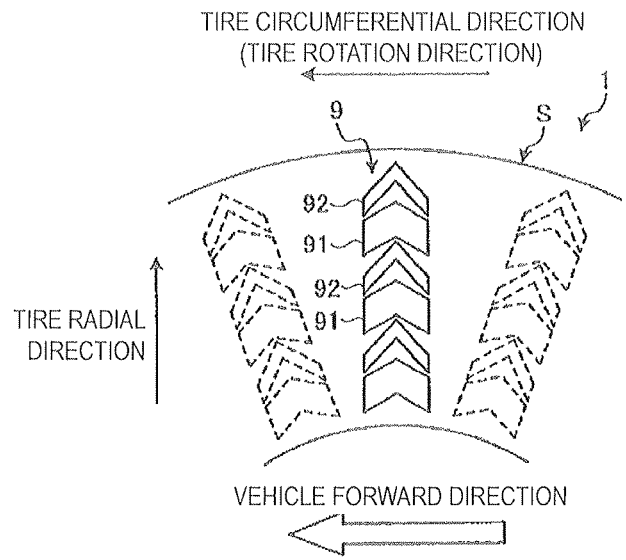
FIG. 12 is an explanatory view illustrating Modified Example 7 of the pneumatic tire depicted in FIG. 1.

In contrast, in Modified Example 7 in FIG. 12, the fin row 9 is constituted from two types of fins 91, 92 having shapes that are different from each other. Also, these fins 91, 92 are arranged alternately in the tire radial direction. Also, the adjacent fins 91, 92 are disposed so as to overlap each other in the tire circumferential direction and the tire radial direction. In this way, the plurality of fins 91, 92 may be disposed mixed.

Also, in the constitution in FIG. 3, all the fins 91 arranged in the tire radial direction belong to one fin row 9.

Figure 13:
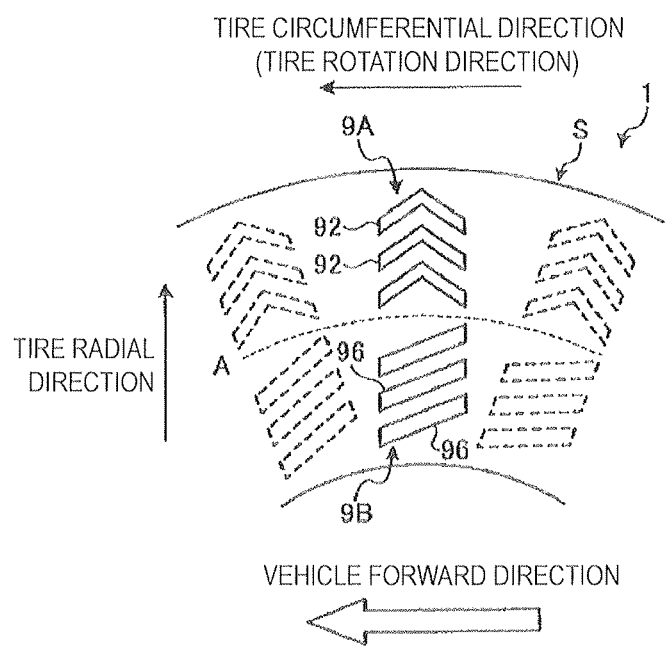
FIG. 13 is an explanatory view illustrating Modified Example 8 of the pneumatic tire depicted in FIG. 1.

In contrast, in Modified Example 8 in FIG. 13, two fin rows 9A, 9B are disposed in series in the tire radial direction. In this way, a plurality of fin rows 9A, 9B may be disposed adjacently in the tire radial direction. Also, the fins 92 of the first fin row 9A and the fins 96 of the second fin row 9B have different shapes from each other.

Also, in Modified Example 8 in FIG. 13, the first fin row 9A is disposed in an area on the outer side in the tire radial direction with the tire maximum width position A as the boundary, and the second fin row 9B is disposed in an area on the inner side in the tire radial direction. Also, these fin rows 9A, 9B are disposed having a gap between each other, without overlapping in the tire radial direction. Therefore, none of the fins 92, 96 are disposed on the tire maximum width position A.

At the tire maximum width position A, the amount of deformation of the side wall rubber is large when the tire is rolling. Therefore, in Modified Example 8 in FIG. 13, the tire durability is increased by disposing each fin row 9A, 9B in positions deviated from the tire maximum width position A.

The "tire maximum width position A" refers to a position of a point for measuring the tire cross-sectional width stipulated by JATMA (see FIG. 1). Also, the tire cross-sectional width is measured when the tire is mounted on a standard rim, inflated to a standard inner pressure, and no load is applied.

Also, in the constitution in FIG. 3, the axis of the fin row 9 (the line that joins the centers of gravity of each fin 91, 91) coincides with the tire radial direction. Therefore, in one fin row 9, all the fins 91 are disposed with their phases aligned in the tire circumferential direction, overlapping each other.

Figure 14:
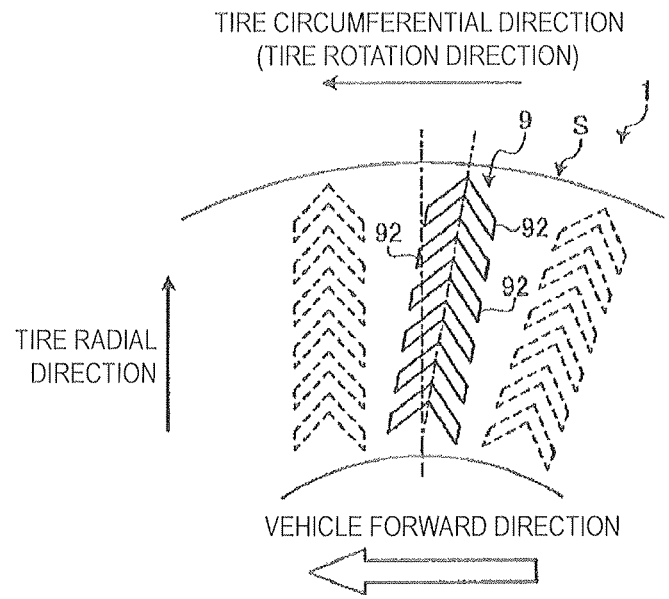
FIG. 14 is an explanatory view illustrating Modified Example 9 of the pneumatic tire depicted in FIG. 1.
Figure 15:
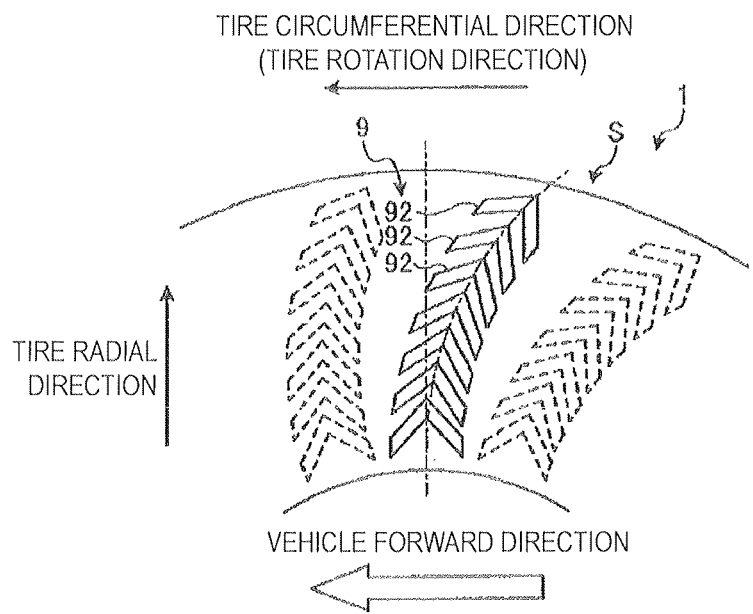
FIG. 15 is an explanatory view illustrating Modified Example 10 of the pneumatic tire depicted in FIG. 1.
Figure 16:
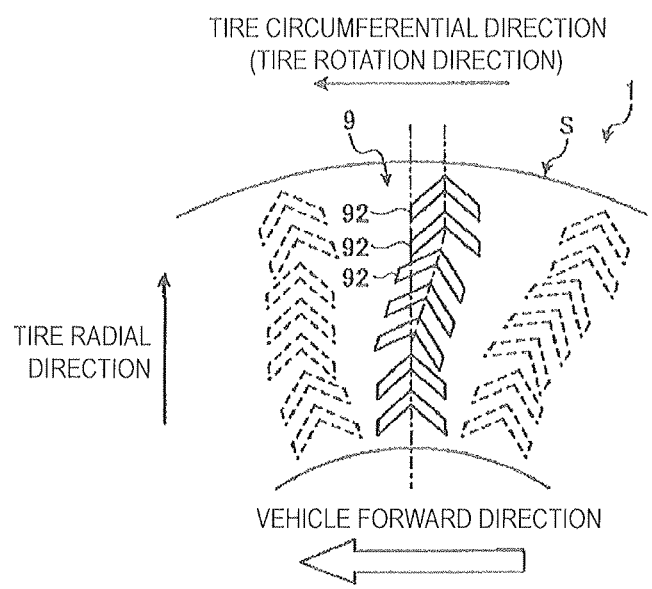
FIG. 16 is an explanatory view illustrating Modified Example 11 of the pneumatic tire depicted in FIG. 1.

However, the configuration is not limited to this, and the axis of the fin row 9 need not coincide with the tire radial direction (see FIGS. 14 through 16). Specifically, of the plurality of fins that constitute the fin row 9, when a straight line is drawn between the center of gravity of the fin on the innermost side in the tire radial direction and the center of gravity of the fin on the outermost side in the tire radial direction (not illustrated on the drawings), if the angle between this straight line and the tire radial direction is ±45 degrees, the fins 91 can be said to be arranged in the tire radial direction. In one fin row 91, it is necessary that adjacent fins 91, 91 overlap each other in the tire circumferential direction and the tire radial direction.

For example, in Modified Example 9 in FIG. 14, the axis of the fin row 9 is a straight line that is inclined at a predetermined angle with respect to the tire radial direction. Also, each fin 92 of the fin row 9 is disposed with their convex sides facing the axial direction of the fin row 9 and the outer side in the tire radial direction. Therefore, each fin 92 is inclined at the predetermined angle with respect to the tire radial direction.

Also in Modified Example 10 in FIG. 15, the axis of the fin row 9 is approximately circular arc shaped, and inclined at a predetermined angle with respect to the tire radial direction while curving. Also, a straight line is drawn passing through the center of gravity of the fin 92 on the innermost side in the tire radial direction of the plurality of fins 92 that constitute the fin row 9, and extended in the tire radial direction. In this case, the angle between the axis of the fin row 9 and this straight line increases from the inner side in the tire radial direction toward the outer side. Also, each fin 92 of the fin row 9 is disposed with their convex sides facing the axial direction of the fin row 9 and the outer side in the tire radial direction. Therefore, the further a fin 92 is on the outer side in the tire radial direction, the greater its inclination angle with respect to the tire radial direction.

Also, in Modified Example 11 in FIG. 16, the axis of the fin row 9 has a bent linear shape that is inclined in part with respect to the tire radial direction. Also, each fin 92 of the fin row 9 is disposed with their convex sides facing the axial direction of the fin row 9 and the outer side in the tire radial direction. Therefore, in the range over which the axis of the fin row 9 is inclined, the fins 92 are each inclined at a predetermined angle with respect to the tire radial direction.

Also, in Modified Examples 9 through 11 in FIGS. 14 through 16, the pneumatic tire 1 preferably has an indicator designating a mounting direction on a vehicle so that the axis of the fin row 9 is inclined or curved to the side opposite the tire rotation direction when the vehicle is traveling forward with respect to the tire radial direction. Therefore, when the tire is mounted on a vehicle, the fin row 9 is disposed with its inclination direction or curving direction facing the direction opposite the tire rotation direction when the vehicle is traveling forward. As a result of mounting in this manner, the turbulent flow generation effect of the fin row 9 when the tire is rotating is increased. Note that the indicator of the tire mounting direction is normally displayed by characters or recesses and protrusions provided of the side wall portion of the tire.

As described above, the pneumatic tire 1 is provided with the turbulent flow generating fins 91 on the surface of the tire side portion S (see FIGS. 1 and 2). Also, the plurality of fins 91 is arranged in the tire radial direction with the predetermined gap g to form a fin row 9. Also, a plurality of fin rows 9 is disposed in the tire circumferential direction at a predetermined pitch. Also, the adjacent fins 91, 91 are disposed so as to overlap each other in the tire circumferential direction and the tire radial direction (see FIG. 3).

In this constitution, adjacent fins 91, 91 are arranged having a predetermined gap g, so compared with a constitution in which a single long fin is disposed, the surface area of the tire side portion S is increased. In this way, the turbulent flow generation effect of the fins 91 is improved. On the other hand, adjacent fins 91, 91 are disposed so as to overlap each other in the tire circumferential direction and the tire radial direction, so at the surface of the tire side portion S, air is effectively agitated. In this way, the turbulent flow generation effect of the fins 91 is increased, which has the advantage that fuel economy is increased.

Also, in the pneumatic tire 1, the tire cross-section height SH and the total length L(=L1+L2+L3) of the distances L1 through L3 between the centers of gravity GI through G4 of the fins 91 in one fin row 9 have a relationship such that $0.10 \leq L/SH \leq 0.90$ (see FIG. 3). In this way, the installation range of the fins 91 is made appropriate, which has the advantage that the turbulent flow generation effect of the fins 91 when the tire is rotating is improved.

Also, in the pneumatic tire 1, the adjacent fins 91, 91 are disposed so as to overlap such that the opposite side is not visible through the gap g when the entire periphery of the fin row 9 is viewed as a projection along the surface of the tire side portion S (see FIG. 3). In this way, the air agitation effect of the fin row 9 is increased, which has the advantage that the turbulent flow generation effect of the fins 91 when the tire is rotating is increased.

Also, in the constitution as described above, the plurality of fins 91 that constitute one fin row 9 have bent portions (or curved portions), and the bent portions (or curved portions) are disposed so that the bent portions (or curved portions) mate with each other (see FIG. 3). In this way, there is the advantage that it is possible to realize a structure in which adjacent fins 91, 91 overlap when viewed from the entire periphery of the fin row 9.

EXAMPLES

Figure 18:
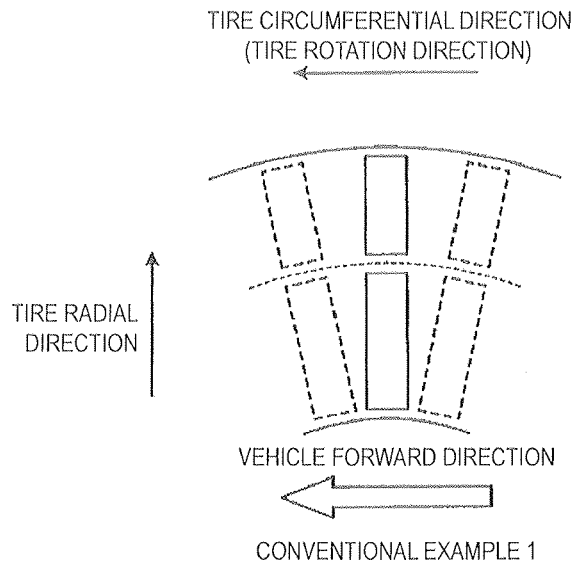
FIG. 18 is an explanatory view illustrating a pneumatic tire according to Conventional Example 1.
Figure 19:
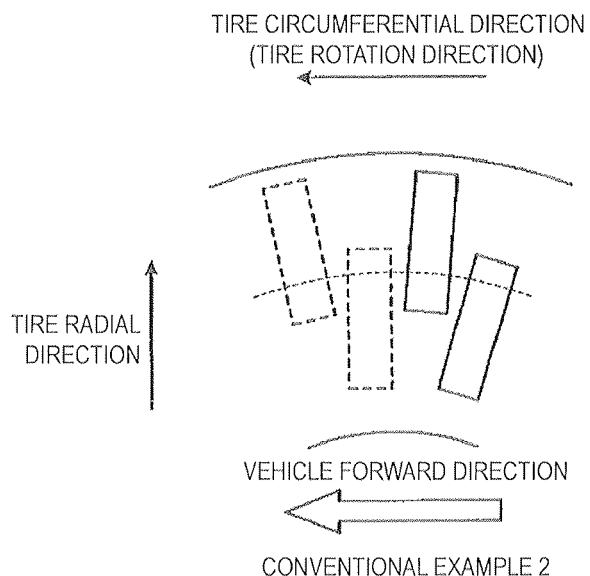
FIG. 19 is an explanatory view illustrating a pneumatic tire according to Conventional Example 2.

FIG. 17 is a table showing the results of performance tests on pneumatic tires according to embodiments of the present technology. FIGS. 18 and 19 are explanatory views illustrating Conventional Examples 1 and 2 of pneumatic tires. These drawings illustrate an enlarged view of the fins per unit pitch.

In these performance tests, evaluation of the fuel economy was performed for a plurality of different pneumatic tires (see FIG. 17). In these performance tests, pneumatic tires having a tire size of 185/65R15 were assembled on a regular rim stipulated by JATMA, inflated to the maximum air pressure and the maximum load stipulated by JATMA was applied to the pneumatic tires.

For the evaluation of fuel economy, the pneumatic tires were mounted on a compact front-wheel drive test vehicles having an engine displacement of 1500 cc+motor assist drive. Then, fuel consumption was measured for a case where a test vehicle was driven 50 laps on a 2 km (total length) test course at a speed of 100 km/h. Based on the measurement results, the fuel consumption rate was calculated, and indexed with the index score of the Conventional Example 1 (100) being a reference. In this evaluation, greater index scores indicate enhanced fuel economy, which is desirable. Also, scores of 102 or greater indicate that the tire is superior.

Working Examples 1 through 7 are pneumatic tires having the constitutions illustrated in FIGS. 3, and 5 through 16 respectively. In these pneumatic tires 1, the fins 91 have a rectangular cross-sectional shape when viewed as a cross-section from a direction perpendicular to the longitudinal direction, and a constant width W=5 mm in the circumferential direction and a constant height H=2 mm (see FIG. 4). Also, the number of pitches (the number of arranged rows of the unit pattern in the tire circumferential direction) of the fin row 9 was 30.

The pneumatic tires of the Conventional Examples 1 and 2 had the constitutions illustrated in FIGS. 18 and 19 respectively. Also, the cross-sectional shape, the width in the circumferential direction, the height, and the number of pitches of the fin were the same as the pneumatic tire 1 according to Working Example 1.

As shown in the test results, it can be seen that the fuel economy of the pneumatic tires 1 according to Working Examples 1 through 7 was improved. Also, it can be seen that the tire fuel economy was further improved due to the installation range L/SH of the fin row 9 and the gap g between adjacent fins being made appropriate.

What is claimed is:

1. A pneumatic tire comprising a turbulent flow generating fin on a surface of a tire side portion; wherein
    a plurality of the fins is arranged in a tire radial direction having a predetermined gap so as to form a fin row, and a plurality of the fin rows is disposed in a tire circumferential direction at a predetermined pitch;
    adjacent fins are disposed so as to overlap each other in the tire circumferential direction and the tire radial direction;
    the plurality of fins constituting one of the fin rows comprises a bent portion or a curved portion, and is disposed so that said bent portions or said curved portions mate with each other; and
    the fin row is constituted from the plurality of fins having a same width in the tire circumferential direction.

2. The pneumatic tire according to claim 1, wherein a sum L of a distance between centers of gravity of the fins in one of the fin rows, and a tire cross-section height SH have a relationship such that $0.10 \leq L/SH \leq 0.90$.

3. The pneumatic tire according to claim 2, wherein when an entire periphery of the fin row is viewed as a projection along the surface of the tire side portion, the adjacent fins are disposed so as to overlap such that an opposite side is not visible through the gap.

4. The pneumatic tire according to claim 1, wherein when an entire periphery of the fin row is viewed as a projection along the surface of the tire side portion, the adjacent fins are disposed so as to overlap such that an opposite side is not visible through the gap.

5. The pneumatic tire according to claim 4, wherein the plurality of fins constituting one of the fin rows comprises a bent portion or a curved portion, and is disposed so that said bent portions or said curved portions mate with each other.

6. The pneumatic tire according to claim 1, wherein as viewed as a cross sectional in a tire meridian direction, a distance DH1 from an edge on the outer side in the tire radial direction of a fin on the outermost side in the tire radial direction to the tire ground contact edge TL, a distance DH2 from an edge on the inner side in the tire radial direction of the fin on the innermost side in the tire radial direction to the rim check line LC, and the tire cross-section height SH have a relationship such that $0.1 \leq DH1/SH \leq 0.5$, and $0.1 \leq DH2/SH \leq 0.5$.

7. The pneumatic tire according to claim 1, wherein a length LH of the plurality of fins in the tire radial direction and a tire cross-section height SH have a relationship such that $0.1 \leq LH/SH$.

8. The pneumatic tire according to claim 1, wherein a width W of the plurality of fins in the circumferential direction is in the range $1 \text{ mm} \leq W \leq 50 \text{ mm}$.

9. The pneumatic tire according to claim 1, wherein a height H of the plurality of fins is in the range $0.5 \text{ mm} \leq H \leq 10.0 \text{ mm}$.

10. The pneumatic tire according to claim 9, wherein the height H is in the range $1.0 \text{ mm} \leq H \leq 5.0 \text{ mm}$.

11. The pneumatic tire according to claim 1, wherein each of the plurality of fins is arranged so that an axial direction of the fin row coincides with the tire radial direction and the plurality of fins constituting the fin row are disposed so as to overlap each other in the tire circumferential direction with aligned phases.

12. The pneumatic tire according to claim 1, wherein the predetermined gap g between adjacent fins is in the range $0.1 \text{ mm} \leq g$.

13. The pneumatic tire according to claim 1, wherein fins that are further to an inner side in the tire radial direction have smaller widths in the circumferential direction.

14. The pneumatic tire according to claim 1, wherein the fin row is constituted from multiple types of fins having shapes that are different from each other with different of the multiple types of fins being arranged alternately in the tire radial direction and disposed so as to overlap each other in the tire circumferential direction and the tire radial direction.

15. A pneumatic tire comprising a turbulent flow generating fin on a surface of a tire side portion; wherein
- a plurality of the fins is arranged in a tire radial direction having a predetermined gap so as to form a fin row, and a plurality of the fin rows is disposed in a tire circumferential direction at a predetermined pitch; and
- adjacent fins are disposed so as to overlap each other in the tire circumferential direction and the tire radial direction;
- wherein adjacent fins are disposed so as to overlap such that an opposite side is not visible through the predetermined gap when the periphery of the fin row is viewed as a projection along the surface of the tire side portion and the predetermined gap is a V-shaped gap.

16. A pneumatic tire comprising a turbulent flow generating fin on a surface of a tire side portion; wherein
- a plurality of the fins is arranged in a tire radial direction having a predetermined gap so as to form a fin row, and a plurality of the fin rows is disposed in a tire circumferential direction at a predetermined pitch;
- adjacent fins are disposed so as to overlap each other in the tire circumferential direction and the tire radial direction;
- the plurality of fins constituting one of the fin rows comprises a bent portion or a curved portion and is disposed so that said bent portions or said curved portions mate with each other; and
- the fin row is constituted from the plurality of fins having similar shapes and different widths in the circumferential direction, and wherein fins that are further to an outer side in the tire radial direction have smaller widths W in the circumferential direction.

17. A pneumatic tire comprising a turbulent flow generating fin on a surface of a tire side portion; wherein
- a plurality of the fins is arranged in a tire radial direction having a predetermined gap so as to form a fin row, and a plurality of the fin rows is disposed in a tire circumferential direction at a predetermined pitch; and
- adjacent fins are disposed so as to overlap each other in the tire circumferential direction and the tire radial direction;
- wherein a plurality of fin rows are disposed adjacently in the tire radial direction and the plurality of fins of a first fin row and the plurality of fins of a second fin row have different shapes from each other.

* * * * *